3,154,063
COMBINATION HUNTER-FISHER SURVIVAL UNIT
James F. White, Rte. 3, Box 693, Anacortes, Wash.
Filed July 24, 1961, Ser. No. 126,095
2 Claims. (Cl. 124—20)

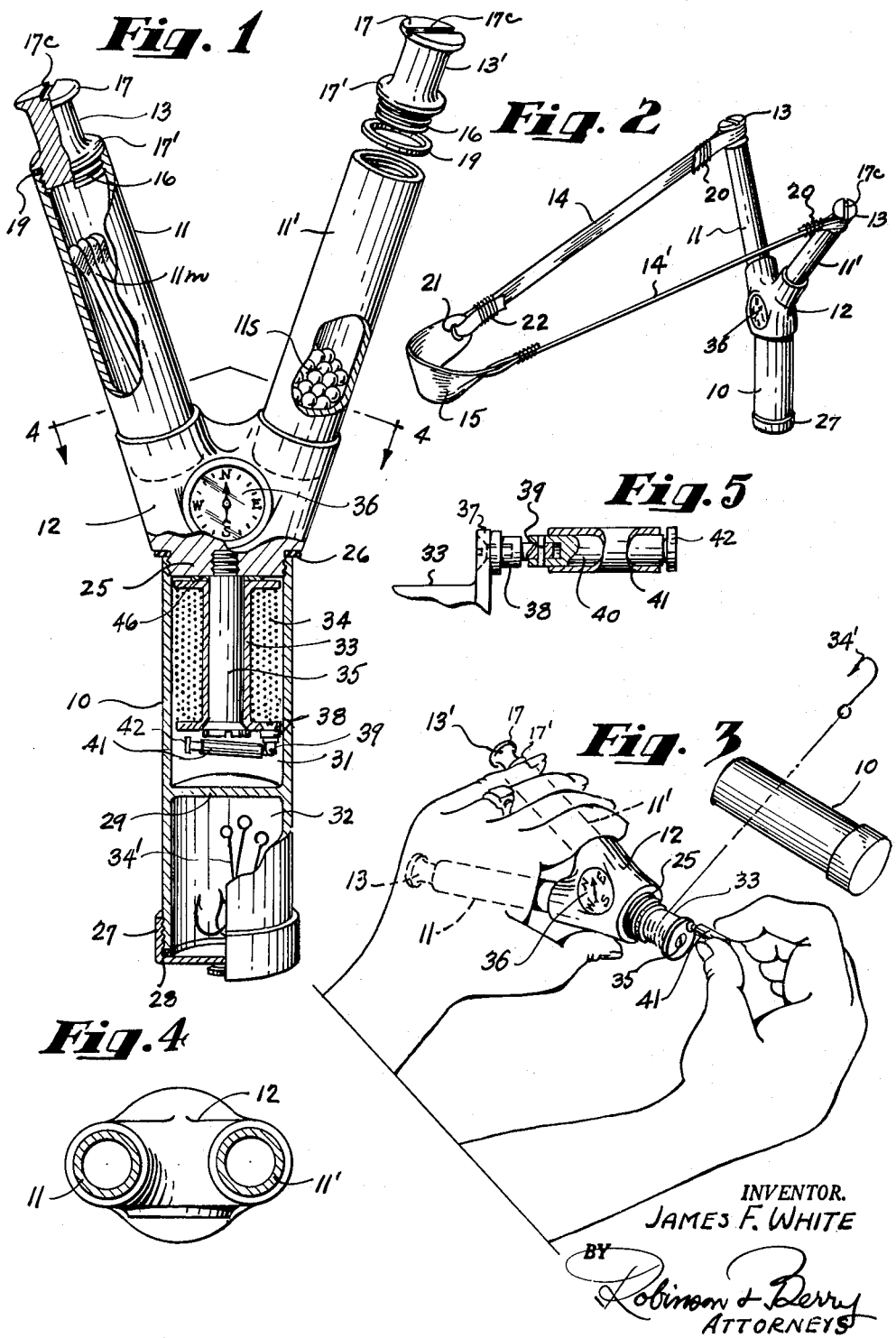

This invention relates to an article that was designed primarily for use as a toy, for pleasure, for use for fishing and hunting and which may be carried as a survival unit. More particularly, the invention relates to a combination of parts which are to be conjointly used for each of the intended purposes or uses of the unit.

It is an object of this invention to provide a unitary article of the above stated kind that is comparatively small in size, light in weight, and which is equipped with water-tight chambers or compartments for the storage therein of articles which are generally considered to be quite essential to qualify the device as a survival unit. For example, the present article is designed for the safe storage therein of matches; as a holder of fishing tackle including hooks and line, and for holding a supply of buckshot, or the like, for use as a sling shot projectile.

It is also an object of this invention to provide a unitary article of the above stated character wherein those parts employed for pleasure are also to be functionally employed in the use of the device as a survival unit.

Specifically stated, the present invention resides in the provision of an article having a frame structure of the ordinary sling shot crotch form, in that it comprises a handle portion with two diverging arms at its outer end, to the ends of which arms elastic bands are to be attached in the formation of the well known form of sling shot while the handle portion of the frame is tubular and provides water-tight compartments therein for safe storage of fishing tackle. The two diverging arms of the crotch are hollow and likewise provide water-tight compartments therein for matches, buckshot and the like. These tubular arms are closed at their outer ends with removable plugs to which the elastic bands of the sling shot are attached. Furthermore, the use of the article, the crotch-like frame serves as a handle both in use of the article as a sling shot and also for use of the article as a fishing reel.

Further objects and advantages of the invention reside in the details of construction of its parts, in their assembly, and in the mode or manner of their use, as will hereinafter be fully described.

In accomplishing these and other objects and advantages of the invention, I have provided the improved details of construction, the preferred forms of which are illustrated in the accompanying drawings, wherein:

FIGURE 1 is an elevation of the article of the present invention with parts broken away for better illustration and better understanding of the construction and mode of its use.

FIG. 2 is a perspective view of the present device when employed as a sling shot.

FIG. 3 is a perspective view showing the present article as employed for fishing.

FIG. 4 is a cross-sectional detail taken on line 4—4 in FIG. 1.

FIG. 5 is an enlarged detail, partly in section, of the reel rotating handle assembly.

Referring more in detail to the drawings:

In its present preferred form of construction, the article of this invention comprises a frame structure of Y-formation including a vertical handle or hand hold portion 10 which, at its upper end mounts a pair of diverging arms 11–11'. The handle portion preferably is tubular and approximately 3½ inches long, and about 1¼ inches in outside diameter. The arms 11–11', likewise, are tubular and are fixedly mounted at their inner ends in a block 12 which, in turn, is mounted on the upper end of the tubular handle member 10. At their outer ends, the tubular arms 11–11' are closed, respectively, by plugs 13–13' removably threaded thereinto and it is to these plugs that the inner ends of the two elastic, rubber bands 14–14' of the sling shot are attached as shown in FIG. 2; these bands being attached at their other or outer ends to the opposite ends of pocket member 15 of the sling shot.

It has been shown in FIG. 1 that each of the plugs 13–13' has a short externally threaded stem 16 at its inner end that is removably threaded into the outer end of the arm 11 or arm 11' which mounts it. Also, each plug is formed in spaced relationship therealong with outer and inner end encircling flanges 17–17' and has a channel 17c formed diametrically across its outer end surface to receive a screw driver bit or the like as an aid for the securement or removal of the plug in the plug mounting arm. The joints between the plugs and outer end surfaces of their respective mounting arms are sealed by gaskets 19 applied between them as shown in FIG. 1.

The preferred manner of securement of the elastic bands 14–14' to the plugs is as shown in FIG. 2, where it is seen that their inner ends are merely looped over or about the plugs 13–13' between the flanges thereon, and are tied as at 20 in FIG. 2 to secure the loops. Likewise, the other or outer end portions of the bands are extended, respectively, through holes as at 21 in the opposite ends of the pocket forming member 15 and are secured by ties as at 22. The pocket 15 preferably is of leather or of a good flexible fabric or an equivalent material.

The tubular handle 10 is threaded at its upper end onto a short, exteriorly threaded handle mounting stem 25 formed on and extending downwardly from the block 12 as shown in FIG. 1, and the joint between these parts is sealed by an interposed gasket 26. At its lower end, the handle 10 is closed by a cap 27 threaded thereon and the joint at that end is sealed by a gasket 28 fitted in the base of the cap. Between its ends, the tubular handle 10 is divided by a bulkhead 29 thereby providing it, in its upper portion, with a reel containing chamber 31 and in its lower end portion with a tackle containing chamber 32. The proportionate lengths of these chambers are preferably as illustrated in FIG. 1.

Contained coaxially in chamber 31 is a reel 33 with a length of fishing line 34 wound thereon which is to be equipped at its outer end with a suitable fish hook 34' as in FIG. 3. The reel is mounted by a spindle in the form of metal screw 35 passed axially therethrough and threaded coaxially into the stem 25 of block 12. The reel is of the usual spool form. It is spaced from the neck of block 12 by a washer or the like 36 and at its lower end, has a stud 38 applied through and fixed in the flange 37 at the outer end of the reel near its outer edge as shown best in FIG. 5.

Pivoted to the stud, as at 39 in FIG. 5, is a short handle bar 40 and fitted to this bar for axial rotation and endwise shifting thereon, is a sleeve 41. This is limited in its outward movement on handle 40 by a head 42 on the outer end of the bar. When the reel is to be housed as in FIG. 1, this bar 40 is folded across and against the end of the reel. When the handle 10 is removed from its mounting stem 25, to provide for use of the reel, as has been illustrated in FIG. 3, the sleeve 41 is then slipped inwardly to its dash line position of FIG. 5 and over the stud 38 and the handle is thus held in a position for use as a crank for axially rotating the reel for paying out or for winding in the line 34 thereon. When the reel is to be housed by the handle 10 the reel handle bar is folded to the position of FIG. 1.

A supply of tackle and hooks may be contained in chamber 32 for use when and as needed. It will here be noted that matches 11m may be held safely and kept dry in the tubular arm 11 and chambered arm 11' serves likewise as a holder for buckshot 11s or the like, for use in the sling shot. Access to these chambered arms is effected merely by removal of their outer end plugs 13 or 13'.

It has also been shown that a compass 36 is applied to a socket provided therefor in one face of the block 12, preferably it would be applied to the face that is away from the sling shot user.

Assuming that the various parts of the device are made as described and assembled as illustrated, its use is as follows:

For its use as a sling shot, all parts of the frame remain firmly joined as shown in FIG. 2. Shot 11s may be removed from arm 11' as required, and used as projectiles to bring down birds, rabbits, squirrels etc. Matches, if needed for fire, are contained in tubular arm 11 and will be kept dry and safe so long as the closure plug 13 is kept tightly applied. The compass 36 will serve to give direction to the user if direction is required.

To use the device for fishing, the handle 10 is first removed, the line 34 extended from the reel with hook 34' attached and when a fish is hooked, the line may be wound in by means of the crank-like handle member 40 attached to the reel end. To house the reel, the crank handle is first folded against the reel and tubular handle 10 passed thereover and threaded onto the stem 25.

The device of this invention may be used as a toy for pleasure purposes. Also, it is suitable to be carried by service men of army or navy as a survival unit in case necessity arises. For example, men lost at sea in a life raft or boat could find the article of value to obtain seafood by fishing, or flying birds by means of the sling shot. The size of the article, is such that it may be conveniently carried in the kit bag or sack, and it may be conveniently stored in a boat or on a raft.

Such articles would preferably be of plastic or any other suitable light weight material. They may be made with or without the compass and in sizes or proportions found most practical.

It is further to be noted that the device is not merely an aggregation of unrelated articles but is so designed that each of its principal parts qualifies the others in their uses. For example, the crotch member for use of the device is a sling shot serves as a holder for the reel when used for fishing. When used in fishing as in FIG. 3; depending on the size of the user's hands either one or both of the slingshot arms 11—11' becomes the equivalent of the conventional fishing pole handle. By the same token, when the present unit is used as a slingshot or game getter, all parts of the frame must be joined together as in FIG. 2. Thus the fishing tackle container 10 becomes the handle of the slingshot.

I have experienced the time and place, while a member of the Armed Forces, behind the enemy lines on Bataan in World War II, when this unit would have provided us with fresh meat and fish and greatly added to our iron rations and our well being.

The slingshot would have been a silent method of getting game which is important in enemy territory and the fishing unit, due to its compactness, and completeness would have supplied us with fresh fish.

What I claim as new is:

1. A sling shot including a crotch having laterally spaced arms extending upwardly from a base block, a spindle fixed in and extending downwardly from said base block, a line winding reel mounted for rotation on said spindle, a line wound on said reel and a turning crank fixed to the lower end of the reel; said reel, as mounted on said spindle providing a hand hold for the sling shot in its functional use and said arms of the crotch providing hand holds for support of the reel in its line winding use.

2. A sling shot according to claim 1 wherein said base block is formed coaxially about the mounted end of said spindle with a threaded shank of greater diameter than said line winding reel and a tubular sleeve threaded at one end onto said shank to protectively enclose the reel and line as wound thereon and adapted to be removed from said shank for use of the line in winding it from or onto the reel.

References Cited in the file of this patent
UNITED STATES PATENTS

| | | |
|---|---|---|
| 779,937 | Holt | Jan. 10, 1905 |
| 2,586,170 | Lawrenz | Feb. 19, 1952 |
| 2,800,890 | Starek | July 30, 1957 |
| 2,808,043 | Lombard | Oct. 1, 1957 |
| 2,914,881 | Williams | Dec. 1, 1959 |

OTHER REFERENCES

Publication: The Washington Post; August 29, 1939, page 25, "Donald Duck" cartoon.